(12) United States Patent
Mosier et al.

(10) Patent No.: US 9,846,509 B2
(45) Date of Patent: Dec. 19, 2017

(54) FAIL OPERATIONAL REDUNDANT DIGITAL RESISTIVE TOUCHSCREEN

(71) Applicant: Rockwell Collins, Inc., Cedar Rapids, IA (US)

(72) Inventors: Donald E. Mosier, Cedar Rapids, IA (US); Craig E. Harwood, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 86 days.

(21) Appl. No.: 14/943,627

(22) Filed: Nov. 17, 2015

(65) Prior Publication Data

US 2017/0139521 A1 May 18, 2017

(51) Int. Cl.
*G06F 3/041* (2006.01)
*G06F 3/045* (2006.01)
*G09G 5/14* (2006.01)
*G08G 5/00* (2006.01)

(52) U.S. Cl.
CPC ............ *G06F 3/0416* (2013.01); *G06F 3/045* (2013.01); *G06F 3/0412* (2013.01); *G08G 5/0021* (2013.01); *G09G 5/14* (2013.01); *G09G 2380/12* (2013.01)

(58) Field of Classification Search
CPC .......................... G06F 3/0416; G09G 2380/12
See application file for complete search history.

(56) References Cited

U.S. PATENT DOCUMENTS

| 2015/0181716 A1* | 6/2015 | Jaw | G06F 3/044 216/13 |
| 2016/0170526 A1* | 6/2016 | Lee | G06F 3/044 345/174 |

* cited by examiner

*Primary Examiner* — Dennis Joseph
(74) *Attorney, Agent, or Firm* — Angel N. Gerdzhikov; Donna P. Suchy; Daniel M. Barbieri

(57) ABSTRACT

Alternating touchscreen conductors in each layer of a touchscreen display are connected to separate touchscreen controllers. Each controller completely and separately resolves a location anywhere on the display so that a failure of either controller, or the failure of conductors connected to either controller, do not degrade touchscreen usability. Conductors in separate layers, connected to separate controllers may be isolated via insulators to prevent undesirable shorts. Conductors are shaped to minimize the area covered by insulators and maximize the area of useful conductor overlap.

17 Claims, 9 Drawing Sheets

FAIL OPERATIONAL REDUNDANT DIGITAL RESISTIVE TOUCHSCREEN

BACKGROUND

Digital touchscreens are being adopted for avionics displays. For avionics applications where a touchscreen is the sole source of pilot control for critical functions, failure of the touchscreen may be catastrophic. A single point of failure can cause the entire touchscreen to become unusable. Separate touchscreens may cover separate portions of a display; however, each touchscreen is still susceptible to a single point of failure, and a failure of either touchscreen renders a portion of the display unusable. Such failure may affect operator proficiency even though the display is not completely disabled.

SUMMARY

In one aspect, embodiments of the inventive concepts disclosed herein are directed to a novel apparatus for providing redundant touchscreen controls without a single point of failure.

In a further aspect, embodiments of the inventive concepts are directed to alternating touchscreen conductors in each layer of a touchscreen display connected to separate touchscreen controllers. Each touchscreen controller completely and separately resolves a location anywhere on the display. Conductors in separate layers, connected to separate touchscreen controllers may be isolated via insulators.

In a further aspect, conductors are shaped to minimize the area covered by insulators and maximize the area of useful conductor overlap.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
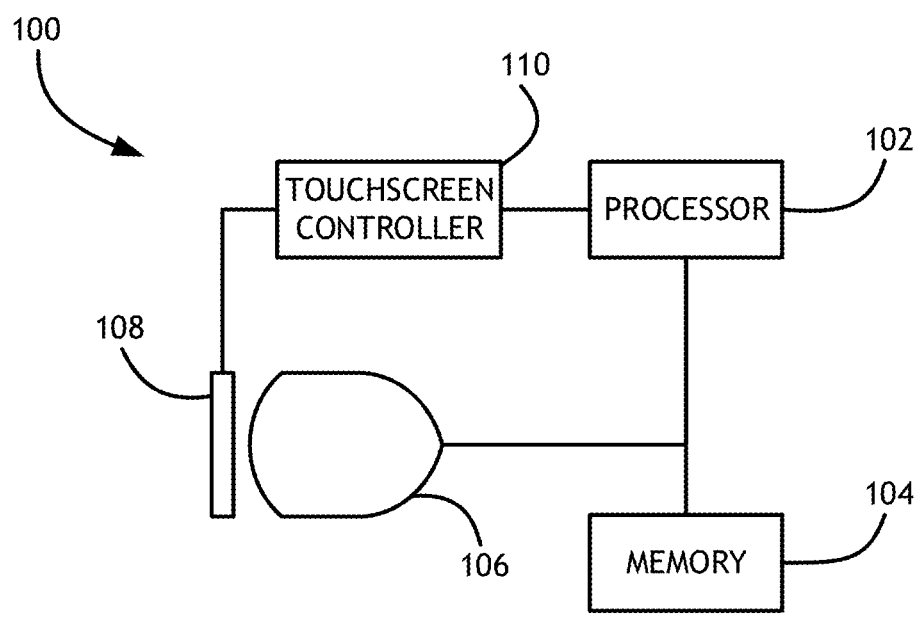
FIG. 1 shows a block diagram of a system for utilizing a touch sensitive display according to one embodiment of the inventive concepts disclosed herein.

Referring to FIG. 1, a block diagram of a touch sensitive display system 100 according to one embodiment of the inventive concepts disclosed herein is shown. The system 100 includes one or more processors 102, a memory 104 connected to the processor 102, and a display 106 and touchscreen 108 connected to the processor 102.

The one or more processors 102 may be implemented as special purpose hardware processor or general purpose processors and are configured to execute processor-executable code stored in the memory 104 to carry out the functionality described herein. The memory 104 may be implemented as any type of persistent or volatile data storage element and stores data and processor-executable code.

The system includes a touch sensitive film 108 corresponding to the display 106. The touch sensitive film 108 is connected to a touchscreen controller 110, the touchscreen controller 110 connected to the one or more processors 102.

In one embodiment, the touchscreen controller 110 receives signals from two or more separate conductor networks within the touch sensitive overlay 108 as described herein. In one embodiment, the touchscreen controller 110 may correlate signals from each of the two or more separate conductor networks to precisely resolve a location on the touch sensitive overlay. In another embodiment, the touchscreen controller 110 correlates signals from each of the two or more separate conductor networks over time to determine if one of the two or more conductor networks is producing a faulty signal and discards the location signal produced by the faulty network. In another embodiment, where a touchscreen controller 110 associated with one of the two or more conductor networks fails, separate touchscreen controllers 110 continues to resolve locations across the entire surface of the touch sensitive overlay 108 via the remaining conductor networks.

Figure 2:
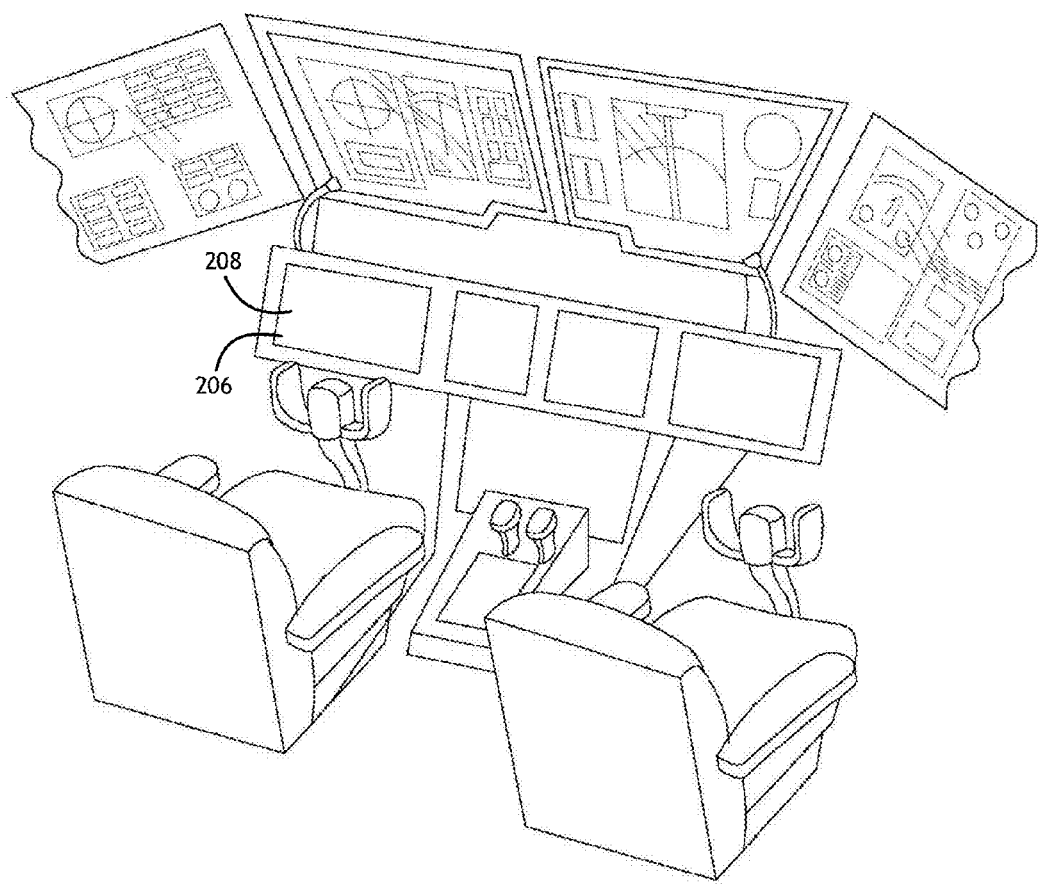
FIG. 2 shows an environmental view of an aircraft cockpit including one embodiment of the inventive concepts disclosed herein.

Referring to FIG. 2, an environmental view of an aircraft cockpit including one embodiment of the inventive concepts disclosed herein is shown. Embodiments of a system such as in FIG. 1 may be incorporated into vehicles such as an aircraft avionics system. An aircraft display 206 with a corresponding redundant touch sensitive overlay 208 as more fully defined herein.

Figure 3:
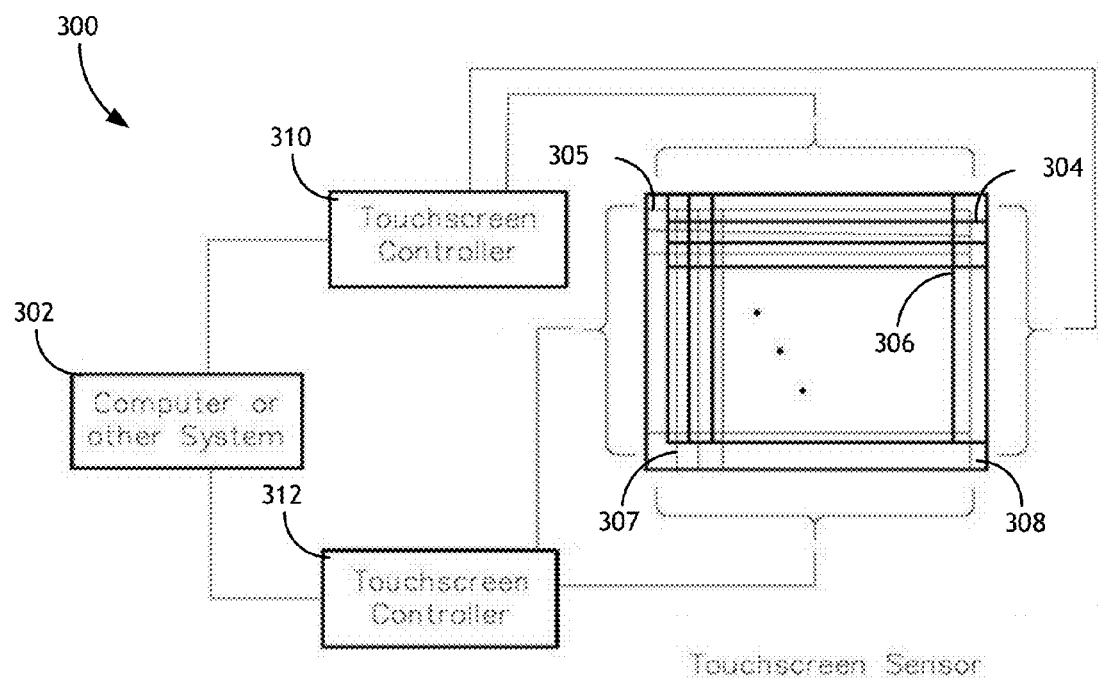
FIG. 3 shows a block diagram of a touch sensitive overlay according to embodiments of the inventive concepts disclosed herein.

Referring to FIG. 3, a block diagram of a touch sensitive overlay according to embodiments of the inventive concepts disclosed herein is shown. A touch sensitive film 308 comprises a first set of horizontal conductors 304 and a second set of horizontal conductors 305; and a first set of vertical conductors 306 and a second set of vertical conductors 307. The first set of horizontal conductors 304 is isolated from the second set of horizontal conductors 305; likewise, the first set of vertical conductors 306 is isolated from the second set of vertical conductors 307. The first set of horizontal conductors 304 and first set of vertical conductors 306 comprise a first conductor network. The second set of horizontal conductors 305 and second set of vertical conductors 307 comprise a second conductor network.

In one embodiment, the processor 302 receives signals from two or more separate touchscreen controllers 310 and 312, each connected to a conductor network within the touch sensitive film 308 as described herein. In one embodiment, the processor 302 may correlate signals from each of the two or more separate touchscreen controllers 310 and 312 to precisely resolve a location on the touch sensitive overlay. In another embodiment, the processor 302 correlates signals from each of the two or more separate touchscreen controllers 310 and 312 over time to determine if one of the two or more touchscreen controllers 310 and 312 is producing a faulty signal and discards the location signal produced by the faulty touchscreen controllers 310 and 312. In another embodiment, each touchscreen controller 310 and 312 may determine its own veracity, either with reference to another touchscreen controller 310 and 312 or by monitoring signals from the corresponding conductor network over time, and self-report a faulty conductor network to the processor 302.

The first set of horizontal conductors 304 and second set of horizontal conductors 305 are interleaved. In one embodiment, the horizontal conductors 304 and 305 are interleaved such that no two horizontal conductors 304 in the first set of horizontal conductors 304 are directly adjacent and no two horizontal conductors 305 in the second set of horizontal conductors 305 are directly adjacent. Generally, each horizontal conductor 304 in the first set of horizontal conductors 304 is bounded by horizontal conductors 305 in the second set of horizontal conductors 305 in a plane defined by the film containing the horizontal conductors 304 and 305. In other embodiments, horizontal conductors 304 and 305 are interleaved in groups such that clusters of horizontal conductors 304 in the first set of horizontal conductors 304 are adjacent and horizontal conductors 305 in the second set of horizontal conductors 305 are also adjacent.

Likewise, the first set of vertical conductors 306 and second set of vertical conductors 307 are interleaved. In one embodiment, the vertical conductors 306 and 307 are interleaved such that no two vertical conductors 306 in the first set of vertical conductors 306 are directly adjacent and no two vertical conductors 307 in the second set of vertical conductors 307 are directly adjacent. Generally, each vertical conductor 306 in the first set of vertical conductors 306 is bounded by vertical conductors 307 in the second set of vertical conductors 307 in a plane defined by the film containing the vertical conductors 306 and 307. In other embodiments, vertical conductors 306 and 307 are interleaved in groups such that clusters of vertical conductors 306 in the first set of vertical conductors 306 are adjacent and vertical conductors 307 in the second set of vertical conductors 307 are also adjacent.

In one embodiment, the first set of horizontal conductors 304 and the first set of vertical conductors 306 are connected to a first touchscreen controller 310 while the second set of horizontal conductors 305 and the second set of vertical conductors 307 are connected to a second touchscreen controller 312. Each of the first touchscreen controller 310 and the second touchscreen controller 312 separately resolves a location on the touch sensitive film 308 and sends the resolved location to a computer processor 302. The computer processor 302 may utilize the separate resolved locations to define an accurate single location corresponding to a user input. The computer processor 302 compares the resolved locations from the first touchscreen controller 310 and second touchscreen controller 312 to detect differences. If differences are present, the processor 302 may averages the two resolved locations to improve accuracy.

While embodiments discussed herein describe and show two separate conductor networks connected to either a single touchscreen controller 310 and 312 or each connected to a separate touchscreen controller 310 and 312, any number of conductor networks and touchscreen controllers 310 and 312 could be utilized. For example, three conductor networks could each be connected to one of three touchscreen controllers 310 and 312, the three conductor networks at least partially interleaved as more fully defined herein. In such an embodiment, or any embodiment utilizing a plurality of touchscreen controllers 310 and 312, the touchscreen controllers 310 and 312 or processor 302 connected to the touchscreen controllers 310 and 312 may also utilize a voting algorithm to determine the most accurate resolved location.

Further, the computer processor 302 may compare the separate resolved locations to analyze the functionality of the first touchscreen controller 310 and second touchscreen controller 312. Upon identifying a fault, the computer processor 302 may disregard data from either the first touchscreen controller 310 or the second touchscreen controller 312 and still resolve a location anywhere on the touch sensitive film 308. In one embodiment, the computer processor 302 utilizes a voting methodology to determine which of the first touchscreen controller 310 and second touchscreen controller 312 is accurate if an unknown fault is identified.

In another embodiment, a single touchscreen controller 310 is connected to all of the horizontal conductors 304 and 305 and vertical conductors 306 and 307. In such an embodiment, the touchscreen controller 310 can resolve a location anywhere on the touch sensitive film 308 even when damage to the touch sensitive film 308 renders either the first conductor network or second conductor network inoperative.

Figure 4:
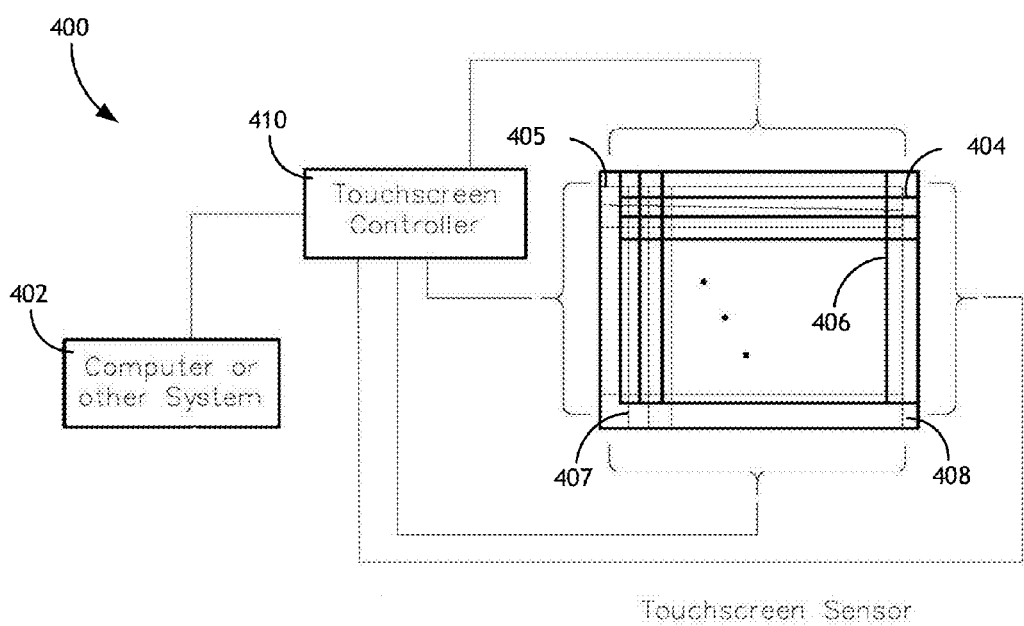
FIG. 4 shows a block diagram of a touch sensitive overlay according to embodiments of the inventive concepts disclosed herein.

Referring to FIG. 4, a block diagram of a touch sensitive overlay according to embodiments of the inventive concepts disclosed herein is shown. A touch sensitive film 408 comprises a first set of horizontal conductors 404 and a second set of horizontal conductors 405; and a first set of vertical conductors 406 and a second set of vertical conductors 407. The first set of horizontal conductors 404 is isolated from the second set of horizontal conductors 405; likewise, the first set of vertical conductors 406 is isolated from the second set of vertical conductors 407. The first set of horizontal conductors 404 and first set of vertical conductors 406 comprise a first conductor network. The second set of horizontal conductors 405 and second set of vertical conductors 407 comprise a second conductor network.

The first set of horizontal conductors 404 and second set of horizontal conductors 405 are interleaved such that no two horizontal conductors 404 in the first set of horizontal conductors 404 are directly adjacent and no two horizontal conductors 405 in the second set of horizontal conductors 405 are directly adjacent. Generally, each horizontal conductor 404 in the first set of horizontal conductors 404 is bounded by horizontal conductors 405 in the second set of horizontal conductors 405 in a plane defined by the film containing the horizontal conductors 404 and 405.

Likewise, the first set of vertical conductors 406 and second set of vertical conductors 407 are interleaved such that no two vertical conductors 406 in the first set of vertical conductors 406 are directly adjacent and no two vertical conductors 407 in the second set of vertical conductors 407 are directly adjacent. Generally, each vertical conductor 406 in the first set of vertical conductors 406 is bounded by vertical conductors 407 in the second set of vertical conductors 407 in a plane defined by the film containing the vertical conductors 406 and 407.

A single touchscreen controller 410 is connected to all of the horizontal conductors 404 and 405 and vertical conductors 406 and 407. In such an embodiment, the touchscreen controller 410 can resolve a location anywhere on the touch sensitive film 408 even when damage to the touch sensitive film 408 renders either the first conductor network or second conductor network inoperative.

Figure 5:
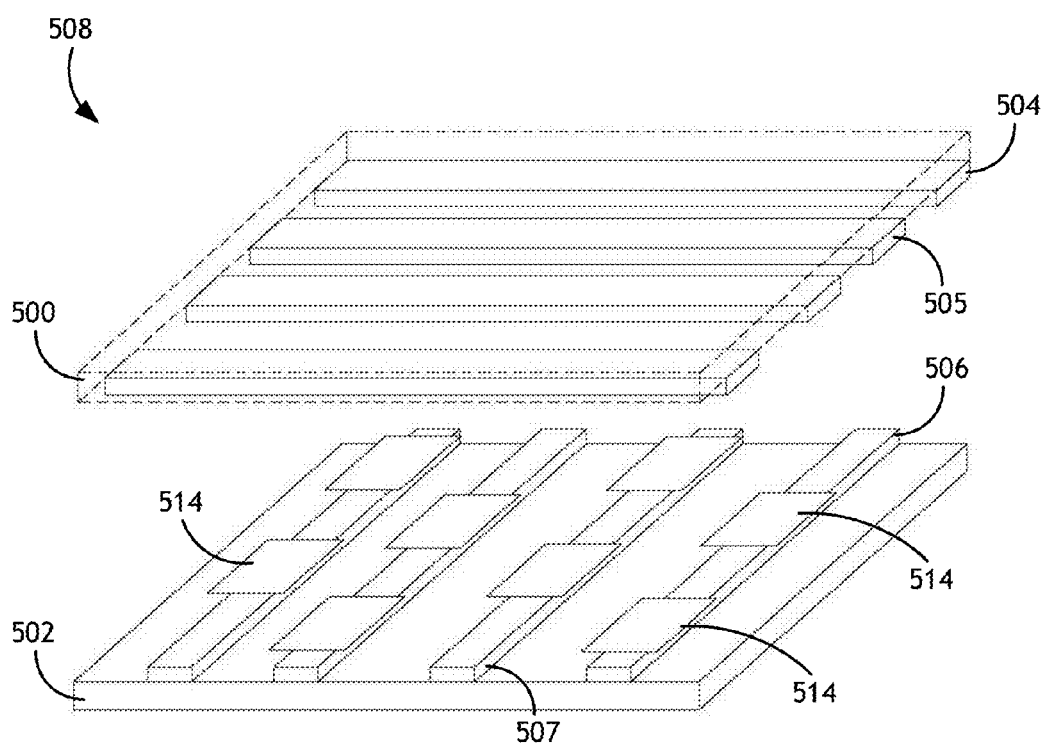
FIG. 5 shows a perspective, exploded view of a touch sensitive film according to embodiments of the inventive concepts disclosed herein.
Figure 6:
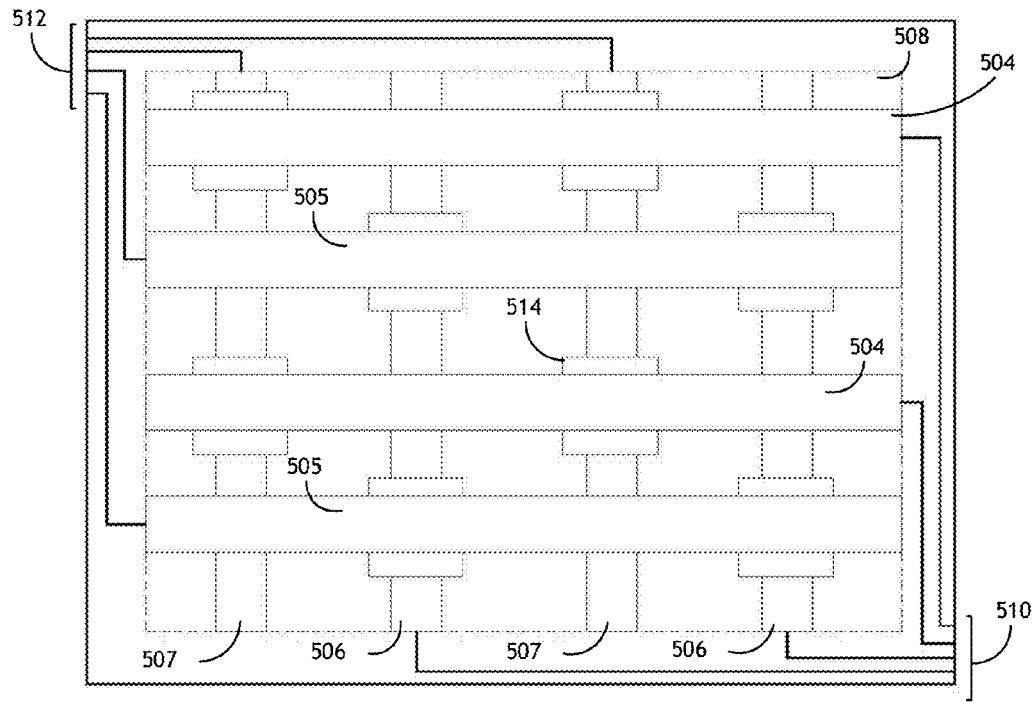
FIG. 6 shows a top, diagrammatic view of a touch sensitive film according to embodiments of the inventive concepts disclosed herein.
Figure 7:
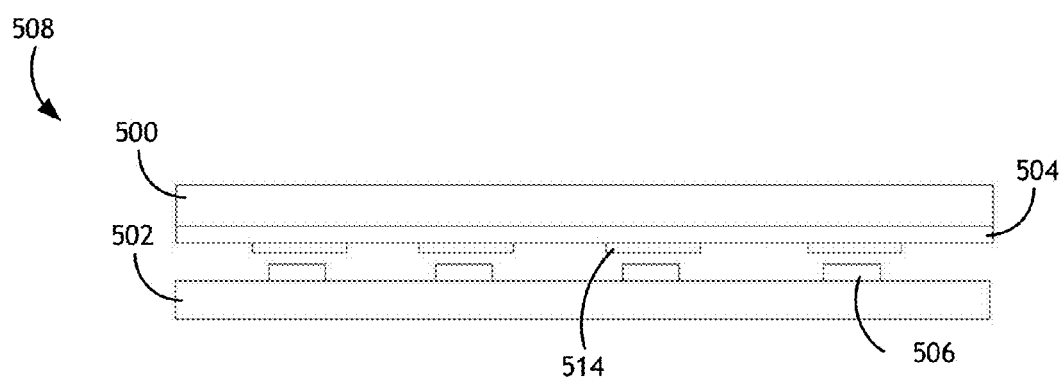
FIG. 7 shows a side, exploded view of a touch sensitive film according to embodiments of the inventive concepts disclosed herein.

Referring to FIGS. 5, 6, and 7, a perspective exploded view of a touch sensitive film, a top diagrammatic view of a touch sensitive film, and a side exploded view of a touch sensitive film according to embodiments of the inventive concepts disclosed herein are shown. The touch sensitive film 508 comprises a top layer 500 generally configured to receive a user input, and a bottom layer 502 generally proximal to a display. One of the top layer 500 or bottom layer 502 includes a first set of horizontal conductors 504 and a second set of horizontal conductors 505 while the other layer includes a first set of vertical conductors 506 and a second set of vertical conductors 507 orthogonal to the first set of horizontal conductors 504 and second set of horizontal conductors 505. The first set of horizontal conductors 504 and second set of horizontal conductors 505 are interleaved. Likewise, the first set of vertical conductors 506 and second set of vertical conductors 507 are also interleaved.

The horizontal conductors 504 and 505 and vertical conductors 506 and 507 are separated by a gap to prevent contact between the horizontal conductors 504 and 505 and vertical conductors 506 and 507 until a pressure is applied to the top layer 500. When pressure is applied a contact is made between certain horizontal conductors 504 and 505 and certain vertical conductors 506 and 507; one or more touchscreen controllers can resolve such contact into one or more specific locations on the touch sensitive film 508.

In some embodiments, contact between horizontal conductors 504 in the first set of horizontal conductors 504 and vertical conductors 507 in the second set of vertical conductors 507 is undesirable; similarly, contact between horizontal conductors 505 in the second set of horizontal conductors 505 and vertical conductors 506 in the first set of vertical conductors 506 is also undesirable. Insulating elements 514 may be disposed between certain horizontal conductors 504 and 505 and certain vertical conductors 506 and 507 to prevent such undesirable contact. Insulating elements 514 may be applied to portions of the horizontal conductors 504 and 505 or vertical conductors 506 and 507; alternatively, the insulating elements 514 may comprise an insulating film layer with cutouts where contact is desirable, or a film layer mesh connecting individual insulating elements 514.

The first set of horizontal conductors 504 and the first set of vertical conductors 506 comprise a first conductor network. The second set of horizontal conductors 505 and the second set of vertical conductors 507 comprise a second conductor network. The first conductor network is connected to a touch sensitive controller via a first set of wires 510 while the second conductor network is connected to a touch sensitive controller via a second set of wires 512. In one embodiment, the first set of wires 510 and second set of wires 512 are directed toward opposing edges of their respective layers 500 and 502 to prevent undesirable crossover between wires 510 and 512.

Figure 8:
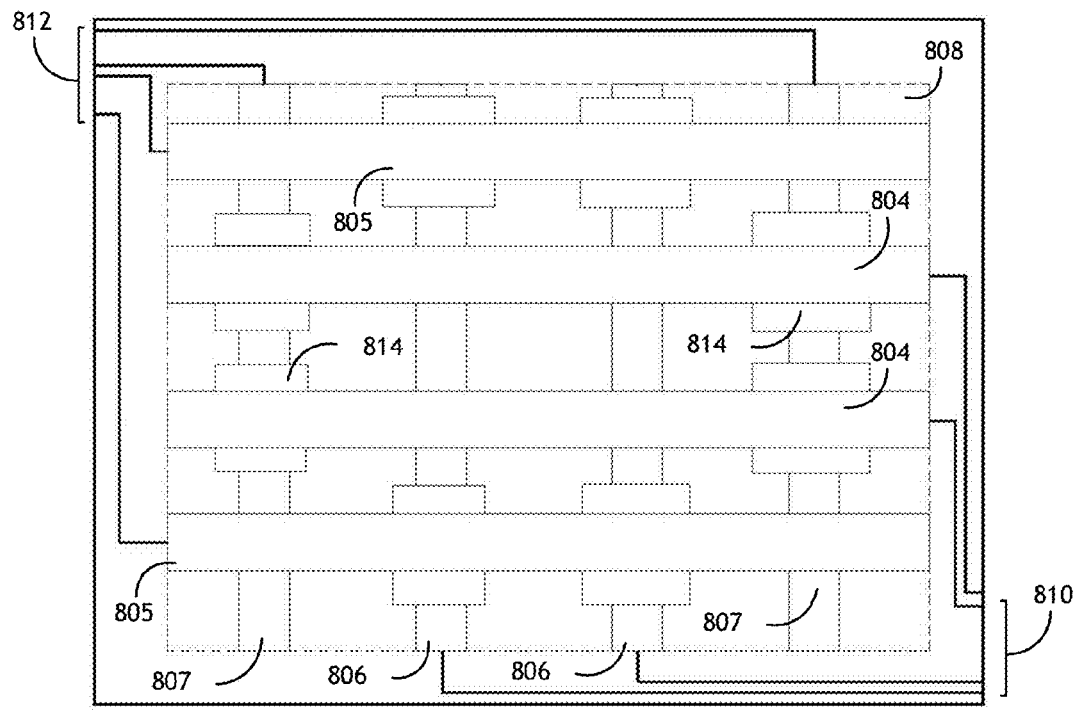
FIG. 8 shows a top, diagrammatic view of a touch sensitive film according to embodiments of the inventive concepts disclosed herein.

Referring to FIG. 8, a top, diagrammatic view of a touch sensitive film according to embodiments of the inventive concepts disclosed herein is shown. The touch sensitive film 808 comprises a top layer 800 generally configured to receive a user input, and a bottom layer 802 generally proximal to a display. One of the top layer 800 or bottom layer 802 includes a first set of horizontal conductors 804 and a second set of horizontal conductors 805 while the other layer includes a first set of vertical conductors 806 and a second set of vertical conductors 807 orthogonal to the first set of horizontal conductors 804 and second set of horizontal conductors 805. The first set of horizontal conductors 804 and second set of horizontal conductors 805 are interleaved in a regular pattern wherein at least two horizontal conductors 804 in the first set of horizontal conductors 804 are directly adjacent and at least two horizontal conductors 805 in the second set of horizontal conductors 805 are directly adjacent. Likewise, the first set of vertical conductors 806 and second set of vertical conductors 807 are also interleaved in a regular pattern wherein at least two vertical conductors 806 in the first set of vertical conductors 806 are directly adjacent and at least two vertical conductors 807 in the second set of vertical conductors 807 are directly adjacent.

The horizontal conductors 804 and 805 and vertical conductors 806 and 807 are separated by a gap to prevent contact between the horizontal conductors 804 and 805 and vertical conductors 806 and 807 until a pressure is applied to the top layer 800. When pressure is applied a contact is made between certain horizontal conductors 804 and 805 and certain vertical conductors 806 and 807; one or more touchscreen controllers can resolve such contact into one or more specific locations on the touch sensitive film 808.

Insulating elements 814 may be disposed between certain horizontal conductors 804 and 805 and certain vertical conductors 806 and 807 to prevent undesirable contact. Insulating elements 814 may be applied to portions of the horizontal conductors 804 and 805 or vertical conductors 806 and 807; alternatively, the insulating elements 814 may comprise an insulating film layer with cutouts where contact is desirable, or a film layer mesh connecting individual insulating elements 814.

The first set of horizontal conductors 804 and the first set of vertical conductors 806 comprise a first conductor network. The second set of horizontal conductors 805 and the second set of vertical conductors 807 comprise a second conductor network. The first conductor network is connected to a touch sensitive controller via a first set of wires 810 while the second conductor network is connected to a touch sensitive controller via a second set of wires 812. In one embodiment, the first set of wires 810 and second set of wires 812 are directed toward opposing edges of their respective layers 800 and 802 to prevent undesirable crossover between wires 810 and 812.

While exemplary embodiments described herein refer to conductor networks where horizontal conductors 804 and 805 are directly interleaved, or interleaved in a regular pattern, such embodiments should not be considered limiting. A combination of different interleaving patterns may be employed, or a generally irregular interleaving pattern provided the resulting touch sensitive film 808 comprises two or more separate conductor networks that may each resolve a location on the touch sensitive film 808.

Figure 9:
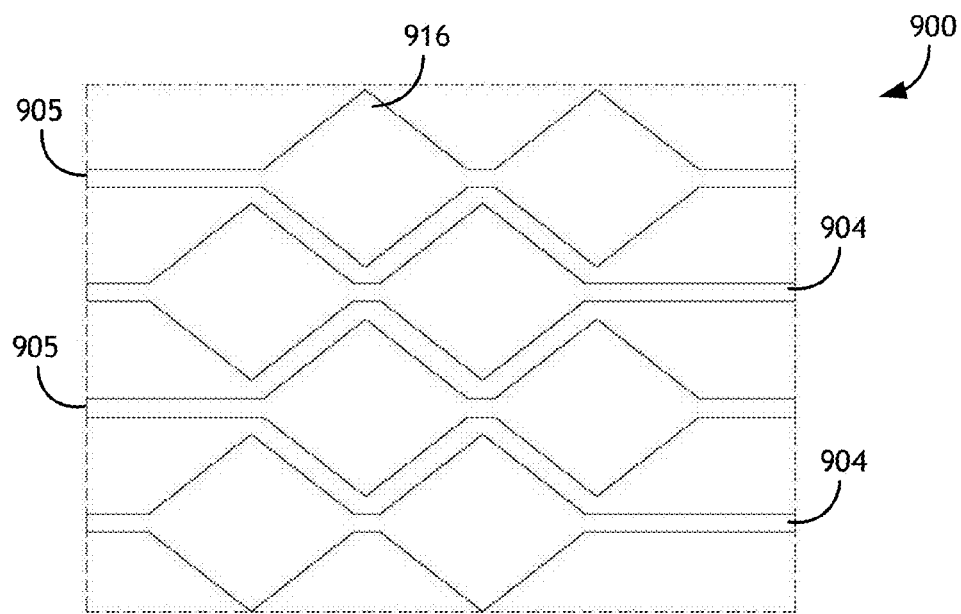
FIG. 9 shows a top view of a layer of a touch sensitive overlay according to embodiments of the inventive concepts disclosed herein.

Referring to FIG. 9, a top view of a layer 900 of a touch sensitive overlay according to embodiments of the inventive concepts disclosed herein is shown. The layer 900 includes a first set of horizontal conductors 904 and a second set of horizontal conductors 905. Each horizontal conductor 904 and 905 comprises enlarged portions 916 to facilitate contact with vertical conductors in a separate layer where such contact is desirable and minimize contact area with vertical conductors in a separate layer where such contact is undesirable. In one embodiment, the enlarged portions 916 are generally rhomboid but other shapes are envisioned.

Figure 10:
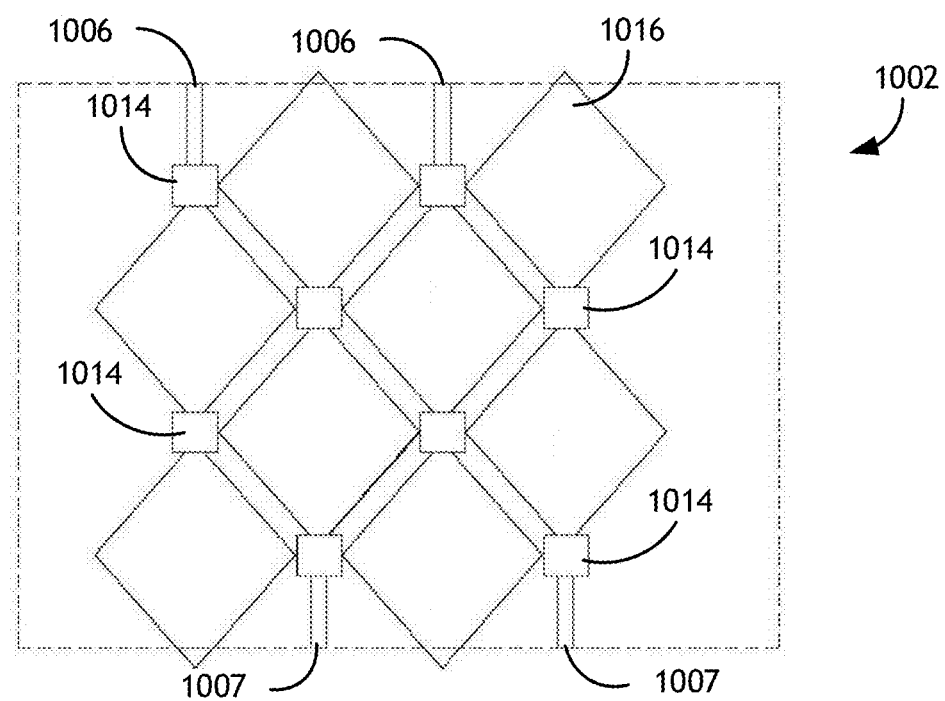
FIG. 10 shows a top view of a layer of a touch sensitive overlay according to embodiments of the inventive concepts disclosed herein.

Referring to FIG. 10, a top view of a layer 1002 of a touch sensitive overlay according to embodiments of the inventive concepts disclosed herein. The layer 1002 includes a first set of vertical conductors 1006 and a second set of vertical conductors 1007. Each vertical conductor 1006 and 1007 comprises enlarged portions 1016 to facilitate contact with horizontal conductors in a separate layer where such contact is desirable and minimize contact area with horizontal conductors in a separate layer where such contact is undesirable. In locations along the vertical conductors 1006 and 1007 where contact is undesirable, insulating elements 1014 are applied to those locations on the vertical conductors 1006 and 1007, or form a separate film between the layer 1002 and a corresponding separate layer of horizontal conductors. Vertical conductors 1006 and 1007 having enlarged portions 1016 where contact is desirable and minimized portions where contact is undesirable allow for insulating elements having a smaller foot print as compared to vertical conductors 1006 and 1007 without enlarged portions 1016.

Figure 11:
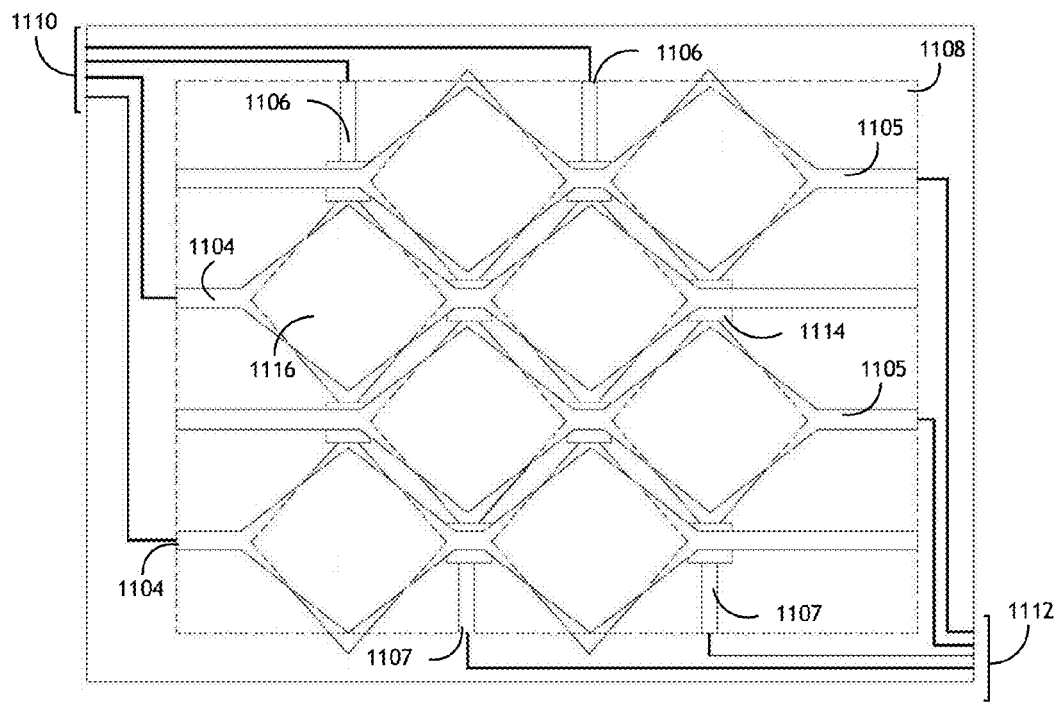
FIG. 11 shows a top view of a touch sensitive film according to embodiments of the inventive concepts disclosed herein.
Figure 12:
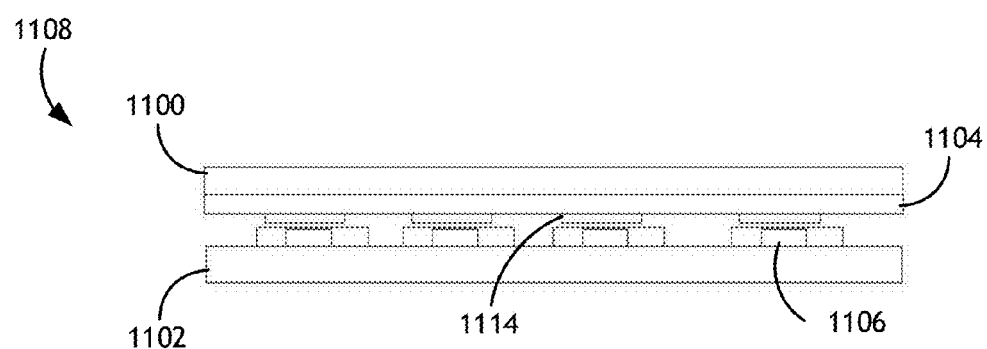
FIG. 12 shows a side view of a touch sensitive film according to embodiments of the inventive concepts disclosed herein.

Referring to FIGS. 11 and 12, a top view of a touch sensitive film 1108 and a side view of a touch sensitive film 1108 according to embodiments of the inventive concepts disclosed herein are shown. A first layer 1100 includes a first set of horizontal conductors 1104 and a second set of horizontal conductors 1105. Each horizontal conductor 1104 and 1105 comprises enlarged portions 1116 to facilitate contact with vertical conductors 1106 and 1107 in a second layer 1102 where such contact is desirable and minimize contact area with vertical conductors 1106 and 1107 in the second layer 1102 where such contact is undesirable.

The second layer 1102 includes a first set of vertical conductors 1106 and a second set of vertical conductors 1107. Each vertical conductor 1106 and 1107 comprises enlarged portions 1116 to facilitate contact with the horizontal conductors 1104 and 1105 in the first layer 1100 where such contact is desirable and minimize contact area with horizontal conductors 1104 and 1105 in the first layer 1100 where such contact is undesirable. In locations along the vertical conductors 1106 and 1107 where contact is undesirable, insulating elements 1114 are applied to those locations on the vertical conductors 1106 and 1107, or form a separate film between the first layer 1100 and second layer 1102. Vertical conductors 1106 and 1107 and horizontal conductors 1104 and 1105 having enlarged portions 1116 where contact is desirable and minimized portions where contact is undesirable allow for insulating elements having a smaller foot print.

Further, resistive changes in conductors having enlarged portions 1116 have a discrete step nature. Contact in different areas of the enlarged portion 1116 may produce distinct, detectable voltage differences that could be used to further refine the location data produced by the corresponding touchscreen controller and minimize touchscreen calibration.

The first set of horizontal conductors 1104 and the first set of vertical conductors 1106 comprise a first conductor network. The second set of horizontal conductors 1105 and the second set of vertical conductors 1107 comprise a second conductor network. The first conductor network is connected to a touch sensitive controller via a first set of wires 1110 while the second conductor network is connected to a touch sensitive controller via a second set of wires 1112. In one embodiment, the first set of wires 1110 and second set of wires 1112 are directed toward opposing edges of their respective layers 1100 and 1102 to prevent undesirable crossover between wires 1110 and 1112. While the locations shown in FIG. 11 are the upper right and lower left respectively, other locations are envisioned provided electrical isolation is maintained.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:
1. A touch sensitive overlay comprising:
   at least one touchscreen controller; and
   a touch sensitive film connected to the at least one touchscreen controller comprising:
      a first layer comprising:
         a first set of horizontal conductors; and
         a second set of horizontal conductors, the first set of horizontal conductors at least partially interleaved with the second set of horizontal conductors;
      a second layer comprising:
         a first set of vertical conductors; and
         a second set of vertical conductors, the first set of vertical conductors at least partially interleaved with the second set of vertical conductors; and
      an insulating layer disposed to isolate the first set of horizontal conductors from the second set of vertical conductors, and the second set of horizontal conductors from the first set of vertical conductors, but allow contact between the first set of horizontal conductors and the first set of vertical conductors, and between the second set of horizontal conductors and the second set of vertical conductors,
   wherein:
      the first set of horizontal conductors and first set of vertical conductors comprise a first conductor network; and the second set of horizontal conductors and second set of vertical conductors comprise a second conductor network electronically isolated from the first conductor network.

2. The touch sensitive overlay of claim 1, wherein the at least one touchscreen controller comprises:
    a first touchscreen controller connected to the first conductor network; and
    a second touchscreen controller connected to the second conductor network,
    wherein each of the first touchscreen controller and second touch screen controller resolve a location within substantially similar areas on a top surface of the first layer.

3. The touch sensitive overlay of claim 2, wherein:
    the first touchscreen controller is connected to the first conductor network along a first edge of the touch sensitive film; and
    the second touchscreen controller is connected to the second conductor network along a second edge of the touch sensitive film.

4. The touch sensitive overlay of claim 1, wherein each of the horizontal conductors and vertical conductors comprise a plurality enlarged portions, each enlarged portion of each horizontal conductor corresponding to an enlarged portion of one of the vertical conductors.

5. The touch sensitive overlay of claim 4, wherein the enlarged portions are rhomboidal.

6. The touch sensitive overlay of claim 4, further comprising a plurality of insulators, each of the plurality of insulators disposed between a horizontal conductor in the first conductor network and a vertical conductor in the second conductor network and between enlarged portions of the horizontal conductor and the vertical conductor, or between a horizontal conductor in the second conductor network and a vertical conductor in the first conductor network and between enlarged portions of the horizontal conductor and the vertical conductor.

7. A redundant touchscreen apparatus comprising:
    a first touchscreen controller;
    a second touchscreen controller; and
    a touch sensitive film comprising:
        a first layer comprising at least:
            a first set of horizontal conductors; and
            a second set of horizontal conductors, the first set of horizontal conductors at least partially interleaved with the second set of horizontal conductors;
        a second layer comprising at least:
            a first set of vertical conductors; and
            a second set of vertical conductors, the first set of vertical conductors at least partially interleaved with the second set of vertical conductors; and
        an insulating layer disposed to isolate the first set of horizontal conductors from the second set of vertical conductors, and the second set of horizontal conductors from the first set of vertical conductors, but allow contact between the first set of horizontal conductors and the first set of vertical conductors, and between the second set of horizontal conductors and the second set of vertical conductors,
    wherein:
        the first set of horizontal conductors and first set of vertical conductors comprise a first conductor network connected to the first touchscreen controller;
        the second set of horizontal conductors and second set of vertical conductors comprise a second conductor network connected to the second touchscreen controller, electronically isolated from the first conductor network; and
        each of the first touchscreen controller and second touch screen controller resolve a location within substantially similar areas on a top surface of the first layer.

8. The redundant touchscreen apparatus of claim 7, wherein:
    the first touchscreen controller is connected to the first conductor network along a first edge of the touch sensitive film; and
    the second touchscreen controller is connected to the second conductor network along a second edge of the touch sensitive film.

9. The redundant touchscreen apparatus of claim 7, wherein each of the horizontal conductors and vertical conductors comprise a plurality enlarged portions, each enlarged portion of each horizontal conductor corresponding to an enlarged portion of one of the vertical conductors.

10. The redundant touchscreen apparatus of claim 9, wherein the enlarged portions are rhomboidal.

11. The redundant touchscreen apparatus of claim 9, further comprising a plurality of insulators, each of the plurality of insulators disposed between a horizontal conductor in the first conductor network and a vertical conductor in the second conductor network and between enlarged portions of the horizontal conductor and the vertical conductor, or between a horizontal conductor in the second conductor network and a vertical conductor in the first conductor network and between enlarged portions of the horizontal conductor and the vertical conductor.

12. An aircraft avionics system comprising:
    a redundant touchscreen comprising:
        at least one touchscreen controller; and
        a touch sensitive film connected to the at least one touchscreen controller comprising:
            a first layer comprising:
                a first set of horizontal conductors; and
                a second set of horizontal conductors, the first set of horizontal conductors at least partially interleaved with the second set of horizontal conductors;
            a second layer comprising:
                a first set of vertical conductors; and
                a second set of vertical conductors, the first set of vertical conductors at least partially interleaved with the second set of vertical conductors; and
            an insulating layer disposed to isolate the first set of horizontal conductors from the second set of vertical conductors, and the second set of horizontal conductors from the first set of vertical conductors, but allow contact between the first set of horizontal conductors and the first set of vertical conductors, and between the second set of horizontal conductors and the second set of vertical conductors,
    wherein:
        the first set of horizontal conductors and first set of vertical conductors comprise a first conductor network; and
        the second set of horizontal conductors and second set of vertical conductors comprise a second conductor network electronically isolated from the first conductor network.

13. The aircraft avionics system of claim 12, wherein the at least one touch screen controller comprises:

a first touchscreen controller connected to the first conductor network; and a second touchscreen controller connected to the second conductor network, wherein each of the first touchscreen controller and second touch screen controller resolve a location within substantially similar areas on a top surface of the first layer.

14. The aircraft avionics system of claim 13, wherein:

the first touchscreen controller is connected to the first conductor network along a first edge of the touch sensitive film; and the second touchscreen controller is connected to the second conductor network along a second edge of the touch sensitive film.

15. The aircraft avionics system of claim 12, wherein each of the horizontal conductors and vertical conductors comprise a plurality enlarged portions, each enlarged portion of each horizontal conductor corresponding to an enlarged portion of one of the vertical conductors.

16. The aircraft avionics system of claim 15, wherein the enlarged portions are rhomboidal.

17. The aircraft avionics system of claim 15, wherein the touch sensitive film further comprises a plurality of insulators, each of the plurality of insulators disposed between a horizontal conductor in the first conductor network and a vertical conductor in the second conductor network and between enlarged portions of the horizontal conductor and the vertical conductor, or between a horizontal conductor in the second conductor network and a vertical conductor in the first conductor network and between enlarged portions of the horizontal conductor and the vertical conductor.

* * * * *